US008543259B2

(12) United States Patent
Schalla et al.

(10) Patent No.: US 8,543,259 B2
(45) Date of Patent: Sep. 24, 2013

(54) SYSTEM AND METHOD FOR VIRTUAL INFORMATION

(75) Inventors: James P. Schalla, Seattle, WA (US); Calsee N. Robb, Seattle, WA (US); William A. Harkness, Everett, WA (US); Buddy L. Sharpe, Mill Creek, WA (US); Heidi J. Kneller, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1295 days.

(21) Appl. No.: 11/927,394

(22) Filed: Oct. 29, 2007

(65) Prior Publication Data
US 2009/0112377 A1 Apr. 30, 2009

(51) Int. Cl.
*B64D 11/00* (2006.01)
*B64D 11/04* (2006.01)

(52) U.S. Cl.
CPC ............ *B64D 11/00* (2013.01); *B64D 11/0007* (2013.01); *B64D 11/0015* (2013.01); *B64D 11/04* (2013.01)
USPC ......... 701/3; 701/14; 701/19; 701/21; 725/76

(58) Field of Classification Search
CPC ............... B64D 11/00; B64D 11/0007; B64D 11/0015; B64D 11/04; G06F 11/00
USPC .................. 725/74–77; 715/706; 701/3, 36, 701/14, 19, 21; 340/286.09, 905; 705/15; 244/118.5
See application file for complete search history.

(56) References Cited

U.S. PATENT DOCUMENTS

| | | | | |
|---|---|---|---|---|
| 4,897,714 A * | 1/1990 | Ichise et al. | | 725/76 |
| 5,311,302 A * | 5/1994 | Berry et al. | | 348/14.03 |
| 5,808,661 A * | 9/1998 | Infiesto et al. | | 348/14.01 |
| 5,893,075 A * | 4/1999 | Plainfield et al. | | 705/14.67 |
| 5,999,882 A * | 12/1999 | Simpson et al. | | 702/3 |
| 6,087,927 A * | 7/2000 | Battistini et al. | | 340/286.09 |
| 6,177,887 B1 * | 1/2001 | Jerome | | 725/76 |
| 6,499,027 B1 * | 12/2002 | Weinberger | | 1/1 |
| 6,661,353 B1 * | 12/2003 | Gopen | | 340/973 |
| 7,587,733 B2 * | 9/2009 | Keen et al. | | 725/76 |
| 7,624,007 B2 * | 11/2009 | Bennett | | 704/9 |
| 7,774,105 B2 * | 8/2010 | Robb et al. | | 701/3 |
| 2003/0064714 A1* | 4/2003 | Sanford et al. | | 455/414 |
| 2008/0063398 A1* | 3/2008 | Cline | | 398/66 |
| 2008/0120558 A1* | 5/2008 | Nathan et al. | | 715/764 |
| 2008/0141315 A1* | 6/2008 | Ogilvie | | 725/77 |
| 2008/0319806 A1* | 12/2008 | Abhyanker | | 705/5 |
| 2009/0109036 A1* | 4/2009 | Schalla et al. | | 340/573.1 |
| 2009/0109223 A1* | 4/2009 | Schalla et al. | | 345/427 |

(Continued)

*Primary Examiner* — John Q Nguyen
*Assistant Examiner* — Michael Whalen
(74) *Attorney, Agent, or Firm* — Harness, Dickey & Pierce, P.L.C.

(57) ABSTRACT

A system for providing information to at least one passenger onboard a mobile platform (such as a train, marine vessel, aircraft or automobile) is provided. The system includes a display device that displays the information. The system also includes a source of user input coupled to the display device that enables the at least one passenger to request the information. The information includes at least galley information. The system further includes a galley control module that generates galley data that includes at least one food service item available onboard the mobile platform, and a graphical user interface module that displays the at least one food service item available onboard the mobile platform to enable the at least one passenger to select at least one of the at least one food service item.

20 Claims, 8 Drawing Sheets (56) References Cited

U.S. PATENT DOCUMENTS

| | | | |
|---|---|---|---|
| 2009/0112378 A1* | 4/2009 | Robb et al. | 701/3 |
| 2009/0112407 A1* | 4/2009 | Kneller et al. | 701/45 |
| 2009/0112638 A1* | 4/2009 | Kneller et al. | 705/5 |
| 2009/0281903 A1* | 11/2009 | Blatstein | 705/15 |
| 2009/0288123 A1* | 11/2009 | Havlovick et al. | 725/77 |
| 2009/0319902 A1* | 12/2009 | Kneller et al. | 715/733 |
| 2010/0217458 A1* | 8/2010 | Schweiger et al. | 701/3 |
| 2011/0313867 A9* | 12/2011 | Silver | 705/15 |

* cited by examiner

SYSTEM AND METHOD FOR VIRTUAL INFORMATION

FIELD

The present disclosure relates generally to passenger entertainment systems onboard a mobile platform, and more particularly to a system and method for using passenger entertainment systems to convey virtual information.

BACKGROUND

The statements in this section merely provide background information related to the present disclosure and may not constitute prior art.

Many mobile platforms (such as trains, ships, aircraft and automobiles) employ entertainment systems adjacent to a passenger seating surface to occupy the passenger during the travel of the mobile platform. For example, in the case of a commercial aircraft, a passenger cabin may be equipped with one or more in-flight entertainment systems. These in-flight entertainment systems may be coupled to a seat back disposed in front of the passenger such that while seated, the passenger may be occupied via the in-flight entertainment system positioned on the seat back in front of them. Personal entertainment devices carried on-board the mobile platform may also utilize the platforms content to wirelessly provide similar in-flight entertainment.

Generally, the in-flight entertainment system is used to occupy passengers during flights, and thus, the in-flight entertainment system may include games, movies and music. Typically, however, the in-flight entertainment system may offer limited information to the passenger, but largely serves to entertain the passenger.

SUMMARY

A system for providing information to at least one passenger onboard a mobile platform is provided. The system includes a display device that displays the information. The system also includes a source of user input coupled to the display device that enables the at least one passenger to request the information. The information includes at least galley information. The system further includes a galley control module that generates galley data that includes at least one food service item available onboard the mobile platform, and a graphical user interface module that displays the at least one food service item available onboard the mobile platform to enable the at least one passenger to select at least one of the at least one food service item.

In one implementation, a method of providing virtual information to at least one passenger onboard an aircraft is provided. The method includes receiving at least one user input requesting information regarding the aircraft. The request for information includes at least a request for flight deck information. The method further includes determining weather conditions currently experienced or expected by the aircraft, and displaying a personalized message from a pilot of the aircraft that describes a current status of the operation of the aircraft based on the weather conditions experienced by the aircraft.

The present teachings also provide an aircraft. The aircraft includes a fuselage that includes a cockpit and a passenger cabin. The passenger cabin includes at least one passenger seat. The at least one passenger seat includes an in-flight entertainment system for use by at least one passenger onboard the aircraft. The in-flight entertainment system includes a display that is operable to provide the at least one passenger with information regarding a current operation of the mobile platform. A display of the information is controlled by a virtual information control system. The virtual information control system includes a virtual information control module that outputs a flight graphical user interface, a galley graphical user interface or a flight deck graphical user interface to the display based on at least one user input.

Further included is a system that provides information to at least one passenger onboard an aircraft via at least one avatar. The system includes a display device that displays the information and the avatar and a source of user input coupled to the display device that enables the at least one passenger to request the information. The information includes galley data, flight deck data or flight data. The system includes a source of data that includes an assigned seat of the at least one passenger that requests the information, a layout of the aircraft, a status of operation of the aircraft based on a planned route of travel for the aircraft, a name of the at least one passenger that requests the information, and weather data that includes weather conditions experienced by the aircraft. The system also includes a galley control module that generates the galley data that includes a graphical representation of at least one food service item available onboard the aircraft. The system comprises a flight control module that generates the flight data based on the user identification data, the mobile platform data and the flight plan data, the flight data including the status of the operation of the aircraft relative to the assigned seat of the at least one passenger illustrated by an avatar of the passenger requesting the information. The system further includes a flight deck control module that generates the flight deck data based on the user identification data and the weather data, the flight deck data including a message from a pilot avatar that describes a current status of the operation of the aircraft based on the weather conditions experienced by the aircraft. The system includes a graphical user interface module that displays the galley data, the flight deck data or the flight data on the display device.

A method of providing virtual information to at least one passenger onboard an aircraft via at least one avatar is further provided. The method includes providing a display device adjacent to the at least one passenger and providing at least one avatar for each of the at least one passengers. The method also includes receiving at least one user input requesting information regarding the aircraft, the request for information including at least a request for flight deck data, galley data or flight data and determining a location of the at least one passenger requesting the information. The method comprises determining weather conditions currently experienced by the aircraft, and determining an inventory of food service items available on the aircraft. The method also includes updating the inventory of food service items to indicate if a food service item is no longer available. The method comprises displaying at least one of: the inventory of food service items on the display device as a graphical representation to enable the at least one passenger to browse the inventory of food service items using the at least one avatar, a message from a pilot avatar that describes a current status of the operation of the aircraft based on the weather conditions experienced by the aircraft on the display device, and a current status of the operation of the aircraft relative to the location of the at least one passenger with the at least one avatar on the display device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Flying as experienced from within a commercial aircraft inherently contains many unknowns. From the complexity of the operation of the aircraft itself to the varied operations of the crew and the routines performed within the cabin, there are many opportunities for passengers to gain information on the events or operation of the aircraft, so that the passenger may better understand the nature of the flight experience. The description herein details a system using an entertainment system to enlighten passengers about the operations of the aircraft going on around them. The entertainment system is further used to enlighten passengers about the crew routine, the flight status, and other information particular to the specific flight plan, weather, and schedule of the aircraft.

Although the following description is related generally to a system and method for alternative communication onboard a mobile platform (such as an aircraft, ship, spacecraft, train or land-based motor vehicle), it will be understood that the system and method for virtual information, as described and claimed herein, can be used with any appropriate application where it would be desirable for an individual to acquire information regarding their surroundings and available services, such as in a hotel. Therefore, it will be understood that the following discussion is not intended to limit the scope of the appended claims to only mobile platforms and mobile platform based systems.

Figure 1:
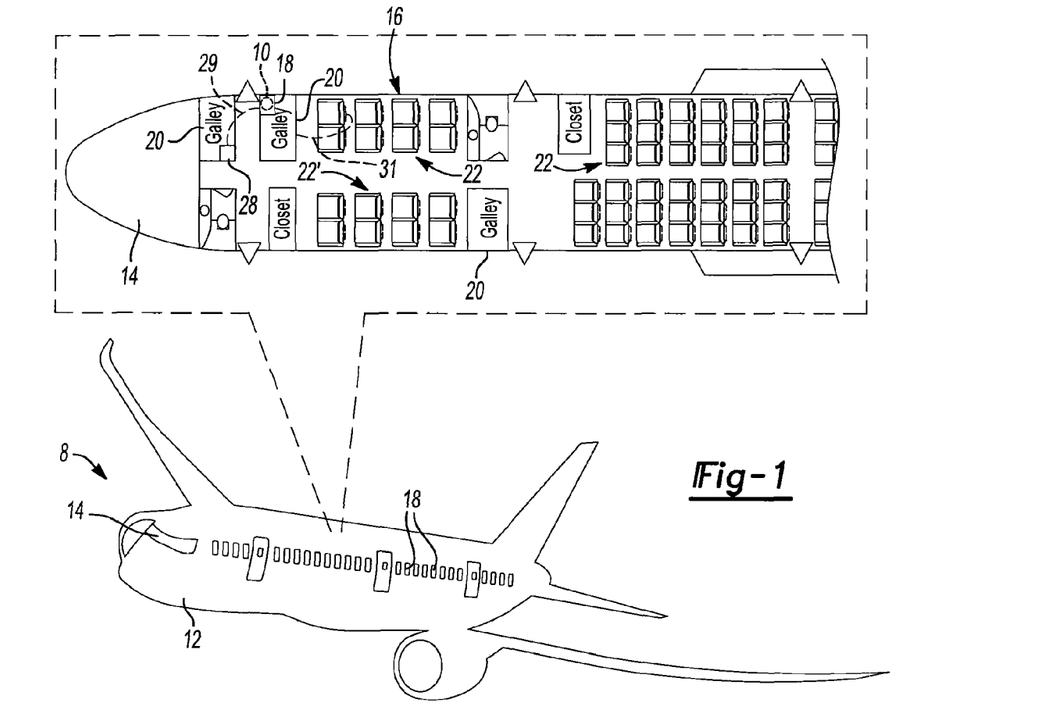
FIG. 1 is a schematic view of a mobile platform incorporating the system and method for virtual information according to the principles of the present disclosure.
Figure 2:
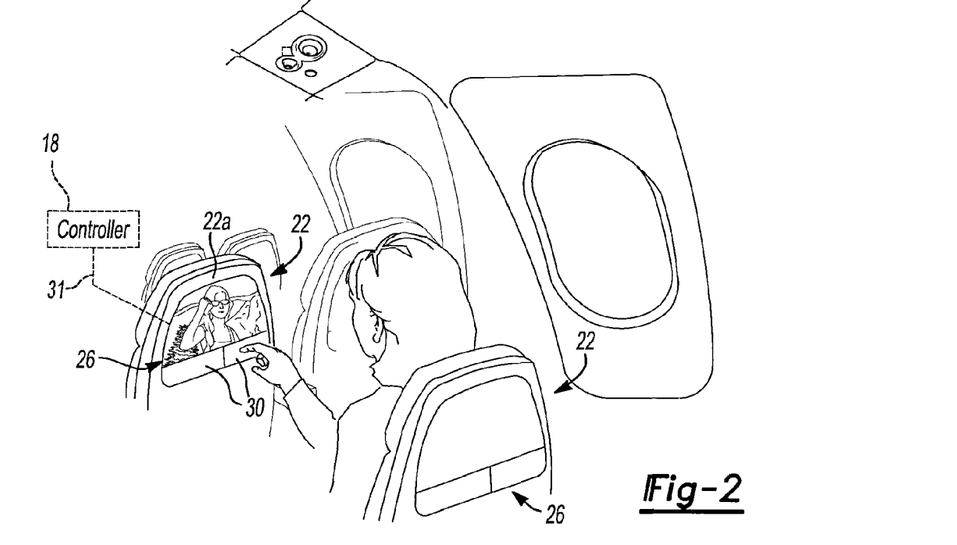
FIG. 2 is schematic view of a passenger onboard the mobile platform of FIG. 1 interfacing with an entertainment system.

With reference to FIGS. 1 and 2, a schematic illustrates an exemplary mobile platform that employs a system and a method for virtual information through a virtual information control module 10. The mobile platform, in this example, is a passenger aircraft 8 that has a fuselage 12, which includes a cockpit 14, a cabin 16 and a controller 18. The cabin 16 includes at least one crew area, such as a galley 20, at least one passenger seat 22 and an in-flight entertainment system 26 (FIG. 2).

With reference to FIG. 1, the galley 20 may include a control panel 28 in communication with and responsive to the controller 18 through a wired or a wireless connection (exemplary connection 29 shown in phantom). The control panel 28 can enable crew of the aircraft 8 to interface with the virtual information control module 10. Thus, the control panel 28 may include at least one user input device and display means, such as a GUI for example, however, any suitable user input device and display means could be employed, such as button(s), a touch screen, a mouse, a stylus and/or a display screen (not specifically shown). The passenger seat 22 provides a surface for a passenger on the aircraft 8. As the passenger seat 22 may comprise any suitable passenger seating surface, as generally known in the art, the passenger seat 22 will not be described in great detail herein. Briefly, however, with reference to FIG. 2, the passenger seat 22 includes a seat back 22a. The in-flight entertainment system 26 may be coupled to the seat back 22a.

The in-flight entertainment system 26 may be responsive to and in communication with the controller 18 through a wired or wireless connection (exemplary connection 31 shown in phantom) in FIGS. 1 and 2. The in-flight entertainment system 26 enables the passenger to remain occupied during the duration of the flight of the aircraft 8, as is generally known. The in-flight entertainment system 26 may include an input device 30, such as a GUI, a touch screen, a button, a touch pen, a keyboard, a joystick, a mouse or any other suitable user input device to enable the passenger to interface with the in-flight communication system 26. The controller 18 may comprise a computer and/or processor, and memory to hold instruction and data related to the virtual information control module 10.

Figure 3:
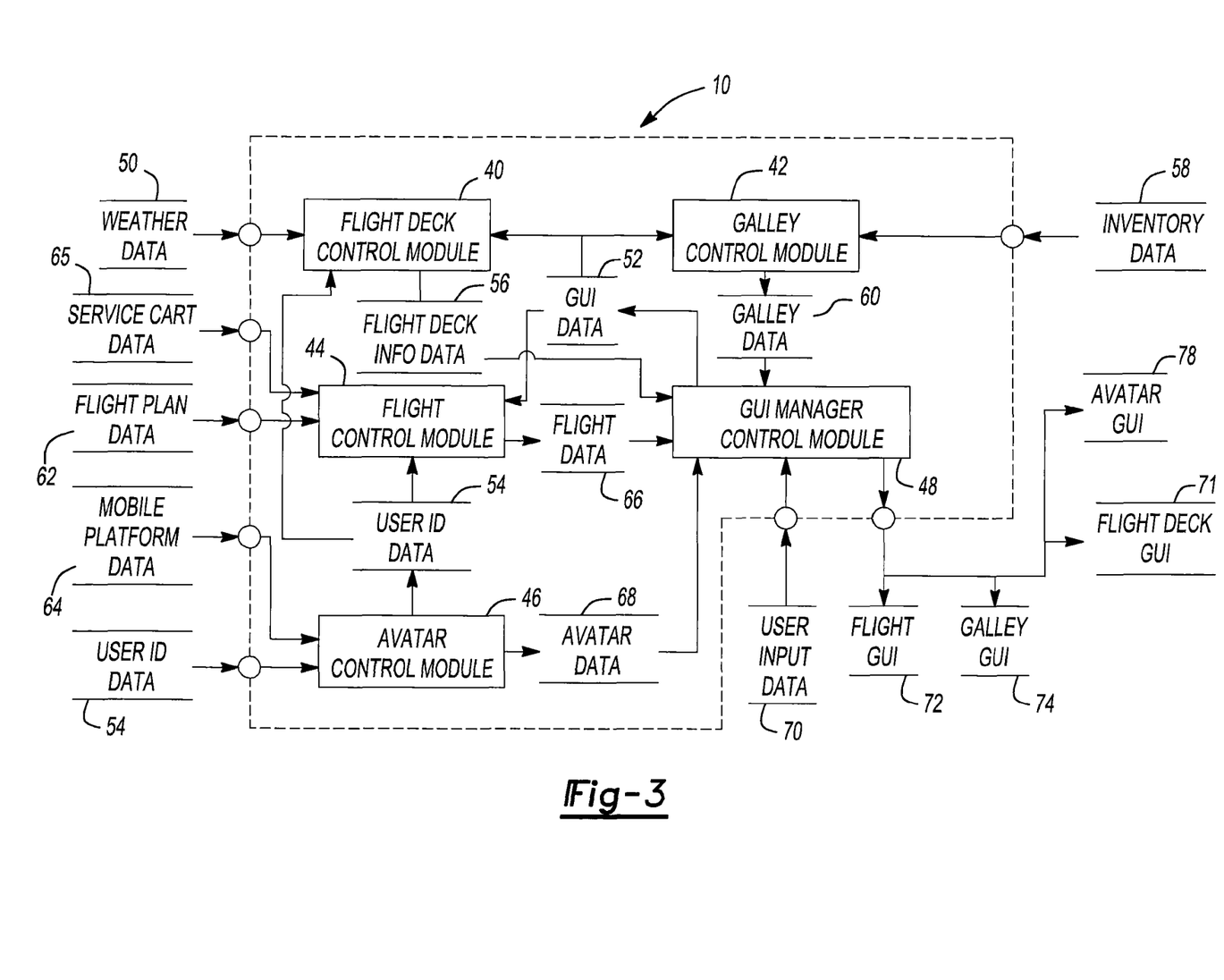
FIG. 3 is a dataflow diagram illustrating an exemplary virtual information control system of the present disclosure.

With reference to FIG. 3, the virtual information control module 10 for the aircraft 8 is illustrated in accordance with the teachings of the present disclosure. The virtual information control module 10 enables the passengers onboard the aircraft 8 to receive information via the in-flight entertainment system 26. In this regard, the virtual information control module 10 operates to output various graphical user interfaces (GUIs) that may enable the passenger to learn about the operation of the aircraft 8, receive customized messages from an occupant of the cockpit 14 and view the available food and beverage items in the galley 20. Thus, the virtual information control module 10 may serve to improve the overall passenger experience by enabling the passengers to determine the level of virtual information they wish to receive, while also enabling the passengers to determine which food and/or beverage item they wish to enjoy when a food service begins on the aircraft 8 or it may enable the passenger to request food or beverage service outside of the service delivery time. Further, this may enable the service of the entire airplane cabin to only offer food and beverage service on a per request basis. In addition, by enabling the passengers to view the food service items prior to the start of the food service, the crew may be able to complete food service faster as they will not have to continually recite the food service items available.

As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 3, a dataflow diagram illustrates various components of an alternative communication system that is embedded within the virtual information control module 10. Various embodiments of the virtual information control module 10 may include any number of sub-modules embedded within the virtual information control module 10. The sub-modules shown in FIG. 3 may be combined and/or further partitioned to similarly control the virtual information of the passengers onboard the aircraft 8. Inputs to the virtual information control module 10 are received from other control modules (not shown) within the aircraft 8, and/or determined by other sub-modules (not shown) within the virtual information control module 10 (not shown). In FIG. 3, the virtual information control module 10 includes a flight deck control module 40, galley control module 42, a flight control module 44, an avatar control module 46 and a graphical user interface (GUI) manager control module 48.

The flight deck control module 40 receives as input weather data 50, GUI data 52 and user identification (ID) data 54. The weather data 50 comprises weather conditions that are currently being experienced or forecast and/or expected by the avionics of the aircraft 8. The GUI data 52 may comprise user input received from the GUI manager control module 48, as will be discussed herein. The user ID data 54 comprises at least a name of the passenger and the passenger seat 22 assigned to the passenger, which may be received from the avatar control module 46, as will be discussed herein. Based on the weather data 50, GUI data 52 and user ID data 54, the flight deck control module 40 sets flight deck information data 56 for the GUI manager control module 48. The flight deck information data 56 comprises a customized message for the passenger from an occupant of the cockpit 14, typically a pilot. Thus, the flight deck information data 56 may comprise a message that details weather conditions the aircraft 8 is traveling through, or is upcoming the time remaining to reach the destination, etc. that may be addressed to that passenger by name and may contain data updated substantially in real-time.

The galley control module 42 receives as input real-time inventory data 58 and GUI data 52. The inventory data 58 comprises an up-to-date list of virtual representations of food service items that are available on the aircraft 8. For example, the inventory data 58 may comprise a list of free beverages and food items, and a list of beverages and food items for purchase. The inventory data 58 may be substantially continuously updated to provide accurate quantities of the food service items, or could be updated at a start and an end of the food service, if desired. For example, if the food service items each include an RFID tag (not shown), then the food service items can be read when they are handed to the passenger to enable the inventory of food service items to be updated substantially in real-time. The GUI data 52 may comprise user input received from the GUI manager control module 48, as will be discussed herein. Based on the inventory data 58 and GUI data 52, the galley control module 42 sets galley data 60 for the GUI manager control module 48. The galley data 60 comprises all of the food service items available on the aircraft 8. Such a system could also be applied to duty free items for sale on board or to other inventory items for sale such as lavatory supplies, etc.

The flight control module 44 receives as input flight plan data 62, GUI data 52, user ID data 54 and mobile platform data 64 and service cart data 65. The flight plan data 62 comprises a route or planned flight for the aircraft 8, and may include a status of the aircraft 8 relative to the planned route of travel, such as whether a landing gear on the aircraft 8 is up, down or retracted, if flaps on the aircraft 8 are down, etc. The GUI data 52 may comprise user input received from the GUI manager control module 48, as will be discussed herein. The user ID data 54 comprises at least a name of the passenger and the passenger seat 22 assigned to the passenger, which may be received from the avatar control module 46, as will be discussed herein. The mobile platform data 64 comprises a layout of the aircraft 8, such as a location of the passenger seats 22, a location of the galley 20, a location of the cockpit 14. The service cart data 65 comprises data indicative of a location of one or more service carts (not specifically shown) relative to the passenger, based on a signal received from a sensor coupled to each service cart (not shown).

Based on the flight plan data 62, GUI data 52, user ID data 54, mobile platform data 64 and the service cart data 65, the flight control module 44 sets flight data 66 for the GUI manager control module 48. The flight data 66 comprises the status of the aircraft 8 relative to the location of the passenger seat 22 assigned to the passenger. In this regard, the flight data 66 provides the passenger with information regarding the status of the aircraft 8 that is experienced by the passenger while in the assigned passenger seat 22. For example, if the passenger seat 22 is above the landing gear of the aircraft 8, the flight data 66 may comprise data including visual representations about the status of the landing gear so that when the passenger in the passenger seat 22 near the landing gear hears a noise or feels the landing gear actuate at the floor level, the passenger may realize, from the flight data 66, that the landing gear has just been retracted or extended.

The avatar control module 46 receives as input user ID data 54, mobile platform data 64 and GUI data 52. As discussed, the user ID data 54 comprises at least a name of the passenger and the passenger seat 22 assigned to the passenger. The user ID data 54 may be received by a passenger list provided by an airline, or may be received based from input to the in-flight entertainment system 26 via the user input device 30 (not specifically shown). The mobile platform data 64 comprises a layout of the aircraft 8, such as a location of the passenger seats 22, a location of the galley 20, a location of the cockpit 14, etc., and data regarding at least one pilot of the aircraft 8 (i.e. name). The GUI data 52 may comprise user input received from the GUI manager control module 48, as will be discussed herein.

Based on the user ID data 54, mobile platform data 64 and GUI data 52, the avatar control module 46 sets avatar data 68 for the GUI manager control module 48. The avatar data 68 comprises a desired look for an avatar of the passenger and an avatar of the pilot to be displayed on the in-flight entertainment system 26. As avatars are generally known in the art, avatars will not be discussed in great detail herein. Briefly, however, the avatar may comprise a pre-selected graphical representation of the passenger that may be used to simulate the passenger virtually interacting with the virtual information control module 10, as will be discussed herein. In addition, the avatar data 68 could comprise data imported into the virtual information control module 10 from a portable storage device, for example, or could comprise data received from a separate control module that enables the passenger to generate an avatar while onboard the aircraft 8. The avatar may also comprise a pre-selected graphical image of the pilot, which may be used to communicate the flight deck information data 56, as discussed herein. Exemplary programs for creating avatars may include Playstation Home (manufactured by Sony Computer Entertainment America, Inc. of Foster City, Calif.), SECOND LIFE™ (manufactured by Linden Labs of San Francisco, Calif.) or THERE™ (manufactured by Makena Technologies, Inc. of Silicon Valley, Calif.).

Figure 4:
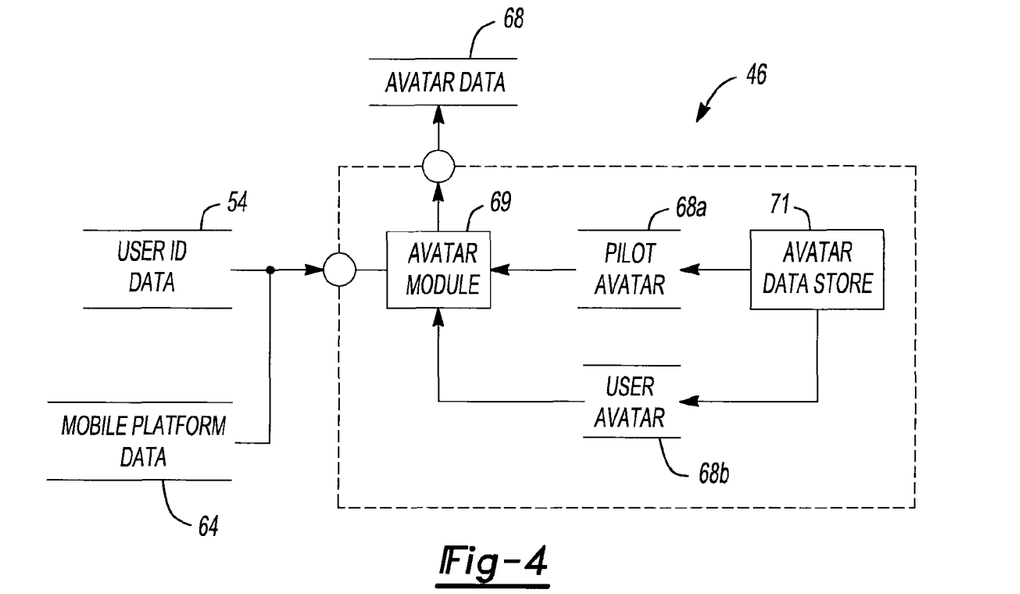
FIG. 4 is a dataflow diagram illustrating an exemplary avatar control system of the present disclosure.

With reference to FIG. 4, a dataflow diagram illustrates an exemplary avatar control system that may be embedded within the avatar control module 46. The avatar control module 46 includes an avatar module 69 and an avatar data store 71. The avatar module 69 receives as input the user ID data 54, the mobile platform data 64, a pilot avatar 68a and the user avatar 68b. The pilot avatar 68a comprises a pilot or pre-selected avatar for the pilot, and the user avatar 68b comprises an avatar selected by the user. Based on the user ID data 54 and the mobile platform data 64, the avatar module 69 may identify if that passenger has a pre-selected avatar, and if the pilot has a pre-selected avatar. The avatar module 69 can determine if a passenger or a pilot has a pre-selected avatar by querying the avatar data store 71 for the pilot avatar 68a and the user avatar 68b that corresponds with the user ID data 54 and the mobile platform data 64. The avatar data store 71 may comprise one or more data storage devices and may be at least one of random access memory (RAM), read only memory (ROM), a cache, a stack, or the like which may temporarily or permanently store electronic data. The avatar data store 71 stores electronic data associated with the pre-selected avatars for the pilot, passenger and optionally, a default avatar. Based on the user ID data 54, the mobile platform data 64, the pilot avatar 68a, and the user avatar 68b, the avatar module 69 outputs the avatar data 68, which comprises the pilot avatar 68a and the user avatar 68b.

With reference back to FIG. 3, the GUI manager control module 48 receives as input flight deck information data 56, galley data 60, flight data 66, avatar data 68 and user input data 70. As discussed, the flight deck information data 56 comprises the personalized message for the passenger from the occupant of the cockpit 14. The galley data 60 comprises all of the food service items available on the aircraft 8, and the flight data 66 comprises the status of the aircraft 8 relative to the location of the passenger seat 22 assigned to the passenger. The avatar data 68 comprises the desired look for the avatar of the passenger and the avatar of the pilot that may be displayed on the in-flight entertainment system 26. The user input data 70 comprises a request from the passenger to access the flight deck information data 56, galley data 60, flight data 66 and avatar data 68. The user input data 70 is received from the user input device 30 coupled to the in-flight entertainment system 26 (FIG. 2).

Based on the flight deck information data 56, galley data 60, flight data 66, avatar data 68 and user input data 70, the GUI manager control module 48 sets the GUI data 52 for the flight deck control module 40, the galley control module 42, the flight control module 44 and the avatar control module 46, and also populates and outputs a flight GUI 72, a galley GUI 74, a flight deck GUI 76 and an avatar GUI 78. The GUI data 52 comprises the request from the passenger to access the flight deck information data 56, galley data 60, flight data 66 and avatar data 68 received through the user input data 70.

Figure 5:
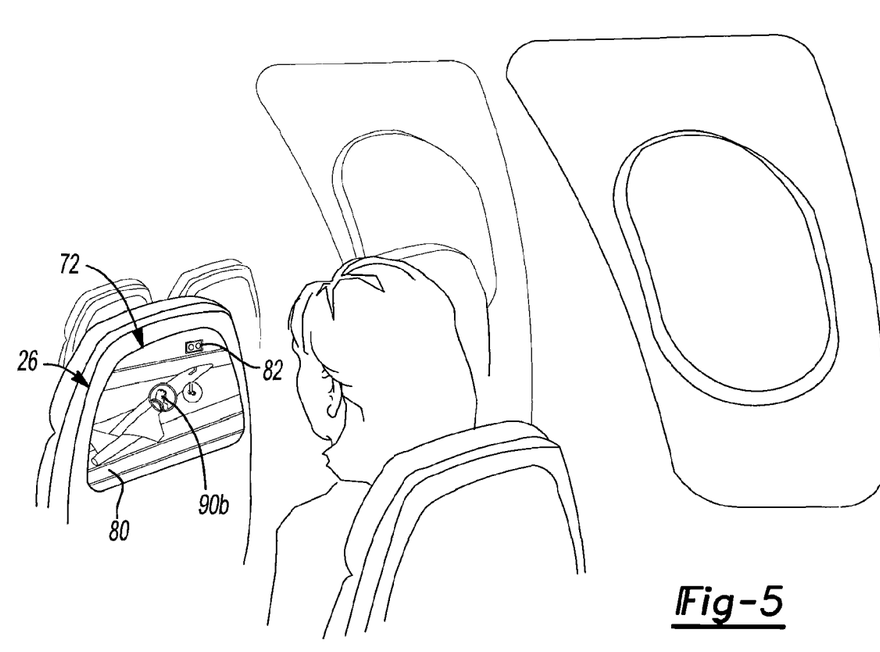
FIG. 5 is a schematic view of a passenger onboard the mobile platform of FIG. 1 interfacing with a flight graphical user interface.

With reference to FIG. 5, the flight GUI 72 comprises a graphical representation of the flight data 66. Thus, the flight GUI 72 may include an aircraft image 80 and a detail button 82. The aircraft image 80 comprises a graphical representation of the status of the aircraft 8 relative to the location of the passenger seat 22 assigned to the passenger. In addition, it may also comprise a location of the galley 20, service cart(s), lavatories 22 and doors 18 relative to the passenger seat 22. The detail button 82 enables the passenger to request, via the user input device 30, to receive more detail regarding the status of the aircraft 8. For example, the selection of the detail button 82 a first time may provide the passenger with a second level of detail of the status and workings of the aircraft 8 relative to their passenger seat 22, and pressing the detail button 82 a second time may provide the passenger with a third level of detail of the status and workings of the aircraft 8 described from their vantage point in the passenger seat 22. For example, the layers of detail that could be obtained by the passenger would include information about the inner workings of the aircraft including, but not limited to, 1) airflow over the wings and how lift is created, then 2) on a deeper level how the flaps and ailerons change the lift, 3) different points during flight at which these wing modifications are beneficial and the tradeoffs involved between deploying the flaps and fuel burn. The layers of detail could be made available for all operations of the aircraft 8 and the surrounding environment, and could be requested by the passenger at any point during the operation of the aircraft 8. The flight GUI 72 may also include additional controls to enable the passenger to manipulate the flight GUI 72 (not shown). The controls 72a may include next, fast forward, back, menu, rewind, play/pause or combinations thereof (not shown).

Figure 6:
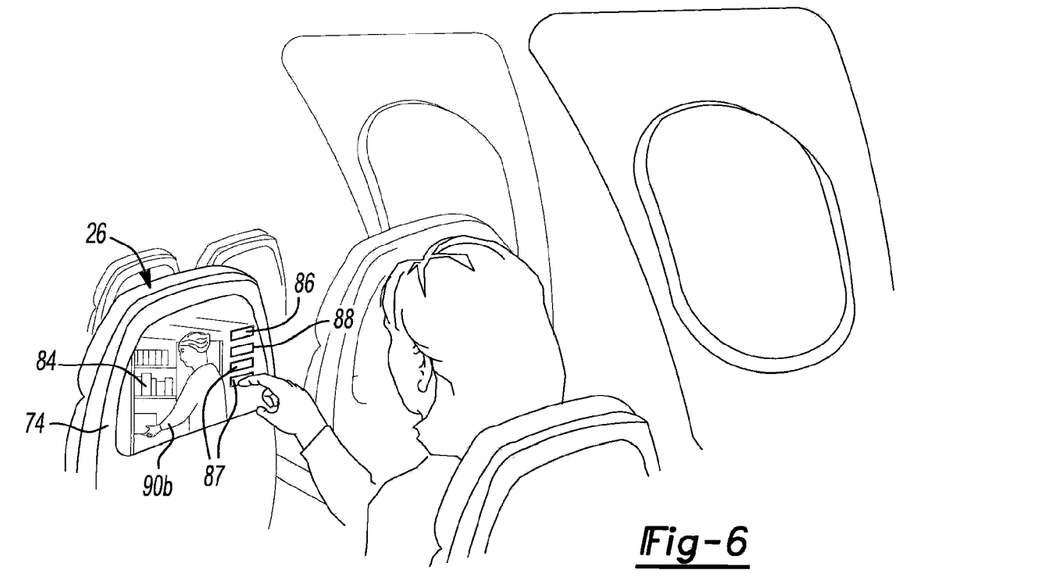
FIG. 6 is a schematic view of a passenger onboard the mobile platform of FIG. 1 interfacing with a galley graphical user interface.

With reference to FIG. 6, the galley GUI 74 is illustrated with a user avatar 90b. The galley GUI 74 comprises a graphical representation of the galley data 60. Thus, the galley GUI 74 may include a galley image 84, a food button 86 and a beverage button 88. The galley image 84 comprises a graphical representation of the galley 20. The food button 86, when selected, provides the user with a graphical representation of all the food items available on the aircraft 8 so that the user may sort through the available food items using the user avatar 90b. The beverage button 88, when selected, provides the user with a graphical representation of all the beverages available on the aircraft 8 so that the user may sort through the available beverage items using the user avatar 90b. The user avatar 90b is displayed with the galley GUI 74 to illustrate the user virtually interacting with the galley 20 as if the galley 20 was more like a kitchen in a home than a galley in an airplane, via the user avatar 90b in combination with the galley GUI 74. The galley GUI 74 may also include controls 74a to enable the passenger to manipulate the galley GUI 74. The controls 74a may include next, fast forward, back, menu, rewind, play/pause or combinations thereof (not specifically shown).

Figure 7:
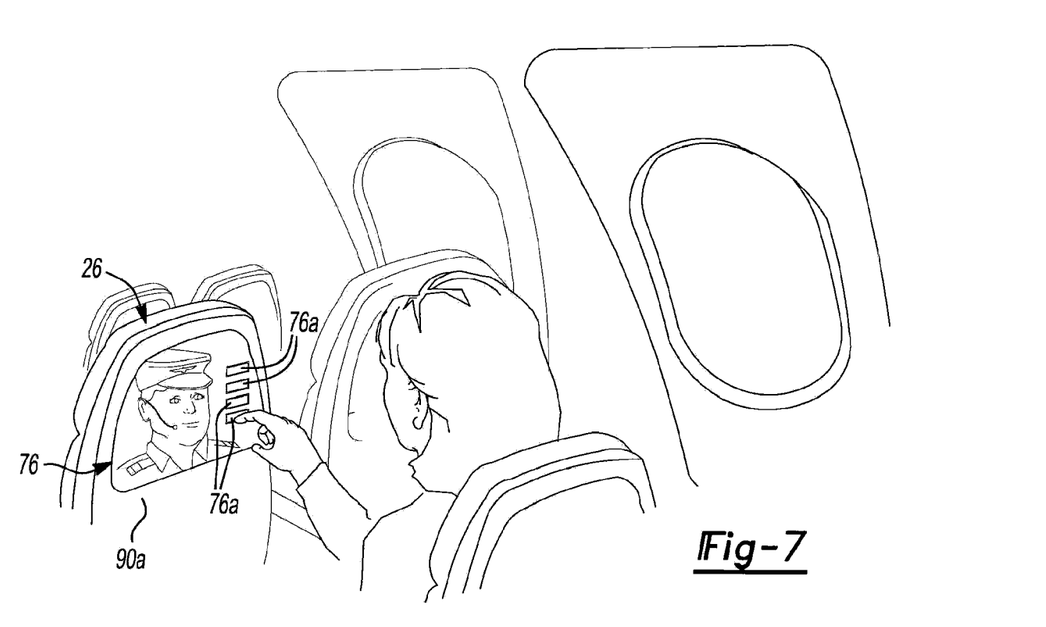
FIG. 7 is a schematic view of a passenger onboard the mobile platform of FIG. 1 interfacing with a flight deck graphical user interface.

With reference to FIG. 7, the flight deck GUI 76 is illustrated with a pilot avatar 90a. The flight deck GUI 76 comprises a graphical representation of the flight deck information data 56. Thus, the flight deck GUI 76 may include a pilot avatar 90a, as will be discussed. The pilot avatar 90a may communicate the customized message in the flight deck information data 56 to the passenger. The flight deck GUI 76 may also include controls 76a to enable the passenger to manipulate the flight deck GUI 76. The controls 76a may include next, fast forward, back, menu, rewind, play/pause or combinations thereof (not specifically shown).

With reference to FIGS. 3, 6 and 7, the avatar GUI 78 is illustrated. The avatar GUI 78 comprises a graphical representation of the avatar data 68 (FIGS. 2 and 3), and may be output with any of the flight GUI 72, the galley GUI 74 and the flight deck GUI 76. The avatar GUI 78 may comprise an avatar image 90, such as the pilot avatar 90a (FIG. 7) and a passenger avatar 90b (FIG. 6).

Figure 8:
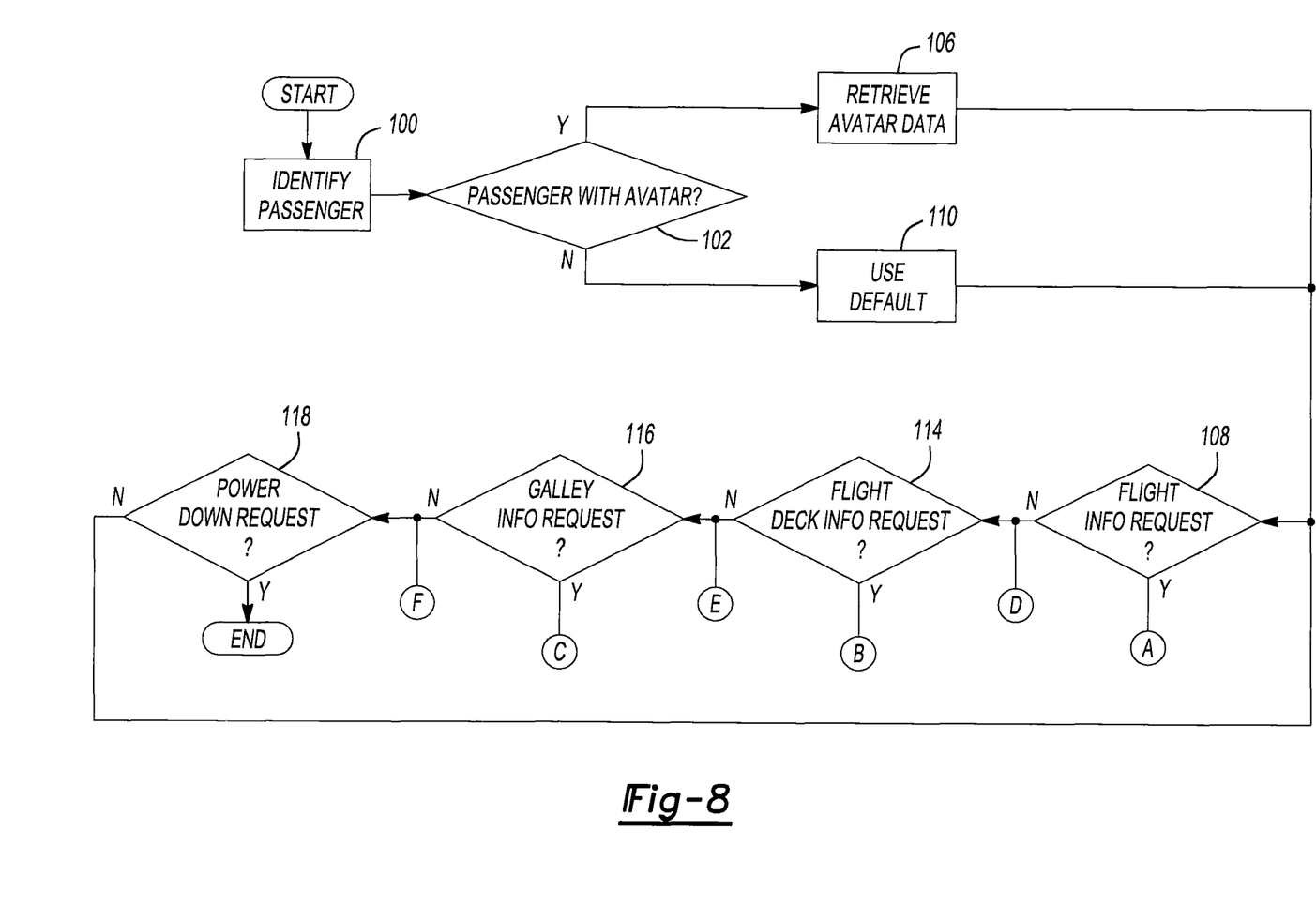
FIG. 8 is a flowchart illustrating an operational sequence for the virtual information control system of FIG. 3.

With reference to FIG. 8, a process flow diagram illustrates an exemplary operational sequence performed by the virtual information control module 10. At operation 100, the method identifies the passenger by the user ID data 54. At operation 102, the method determines if the passenger has a stored user avatar 90b. If the passenger does not have a stored user avatar, then the method goes to operation 110. Otherwise, the method goes to operation 106, at which the method retrieves the user avatar data 68*b* from the avatar data store 71, and then goes to operation 108. If the passenger does not have an avatar, then at operation 110, the method retrieves a default user avatar data 68*b* from the avatar data store 71 and goes to operation 108. At operation 108, the method determines if flight data 66 has been requested by the passenger via the user input device 30. If flight data 66 has been requested, then the method goes to A on FIG. 9. Otherwise, the method goes to operation 114.

Figure 9:
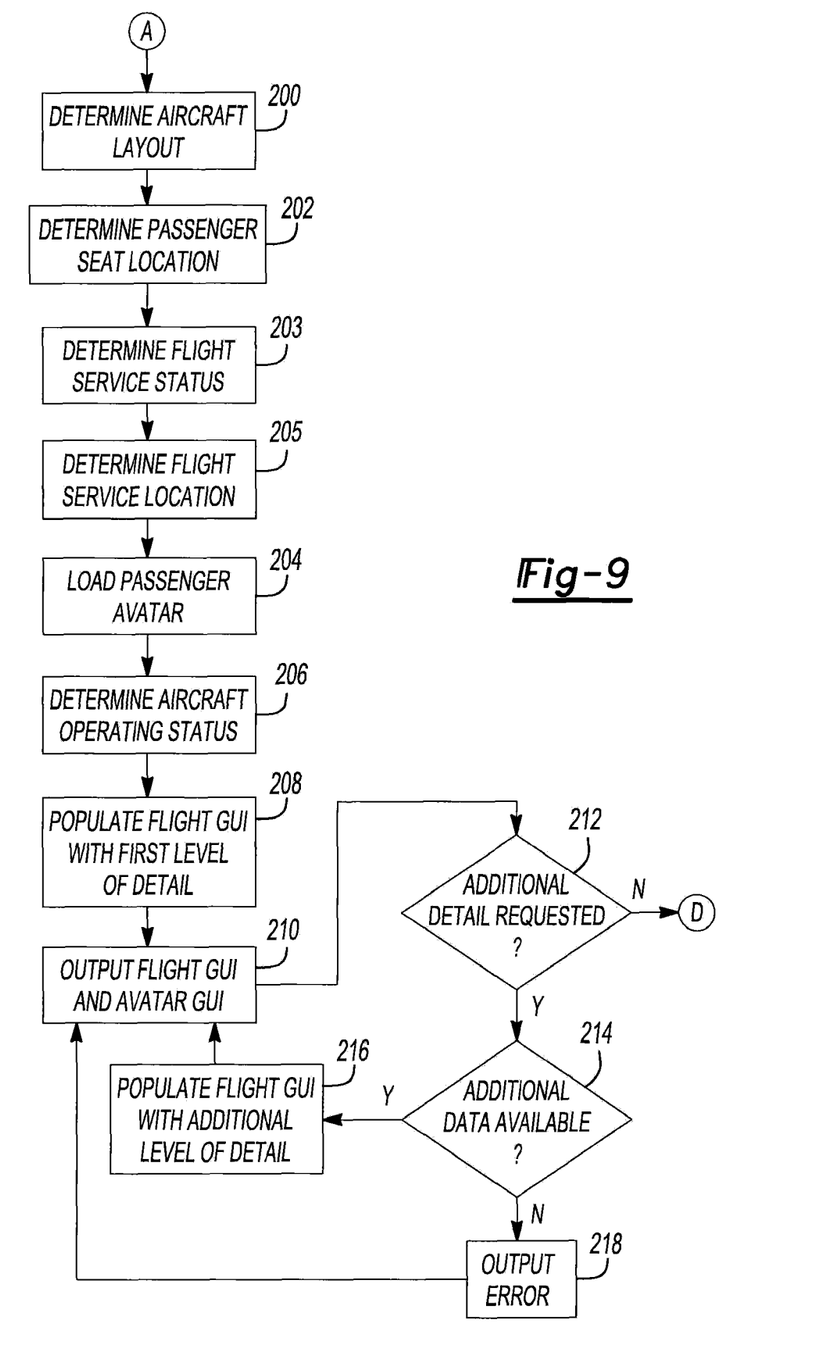
FIG. 9 is a flowchart illustrating an operational sequence for the virtual information control system of FIG. 3.

With reference to FIG. 9, at operation 200, the method determines the aircraft layout based on the mobile platform data 64. At operation 202, the method determines the seat location of the passenger requesting the flight data 66 based on the user ID data 54. At operation 203, the method determines the status of the flight service for the aircraft 8 based on the service cart data 65. At operation 205, the method determines the location of the service cart(s) within the cabin 16, based on the service cart data 65. Then, at operation 204, the method loads the passenger or user avatar data 68*b*. At operation 206, the method determines the aircraft operating status based on the flight plan data 62. Then, at operation 208, the method populates the flight GUI 72 with a first level of detail. At operation 210, the method outputs the flight GUI 72 and the avatar GUI 78 to provide the passenger with the current operating status of the aircraft 8 relative to the assigned passenger seat 22 of the passenger. Thus, the flight GUI 72 and the avatar GUI 78 may graphically illustrate the location of the passenger relative to the aircraft 8 and the aircraft operation they are interested in.

At operation 212, the method determines if additional detail has been requested by the passenger by the passenger selected the detail button 82 via the user input device 30. If no additional detail has been requested by the passenger, then the method goes to D on FIG. 8. Otherwise, if additional detail is requested by the passenger, then the method goes to operation 214. At operation 214, the method determines if additional detail data is available. If additional detail data is available, then at operation 216 the method populates the flight GUI 72 with the additional level of detail. The method loops to 210. Otherwise, if additional detail data is not available, the method outputs an error message to the passenger at operation 218 and then loops to operation 210.

With reference back to FIG. 8, at operation 114, the method determines if flight deck information data 56 has been requested by the passenger via the user input device 30. If flight deck information data 56 has been requested by the passenger, then the method goes to B on FIG. 10. Otherwise, the method goes to operation 116.

Figure 10:
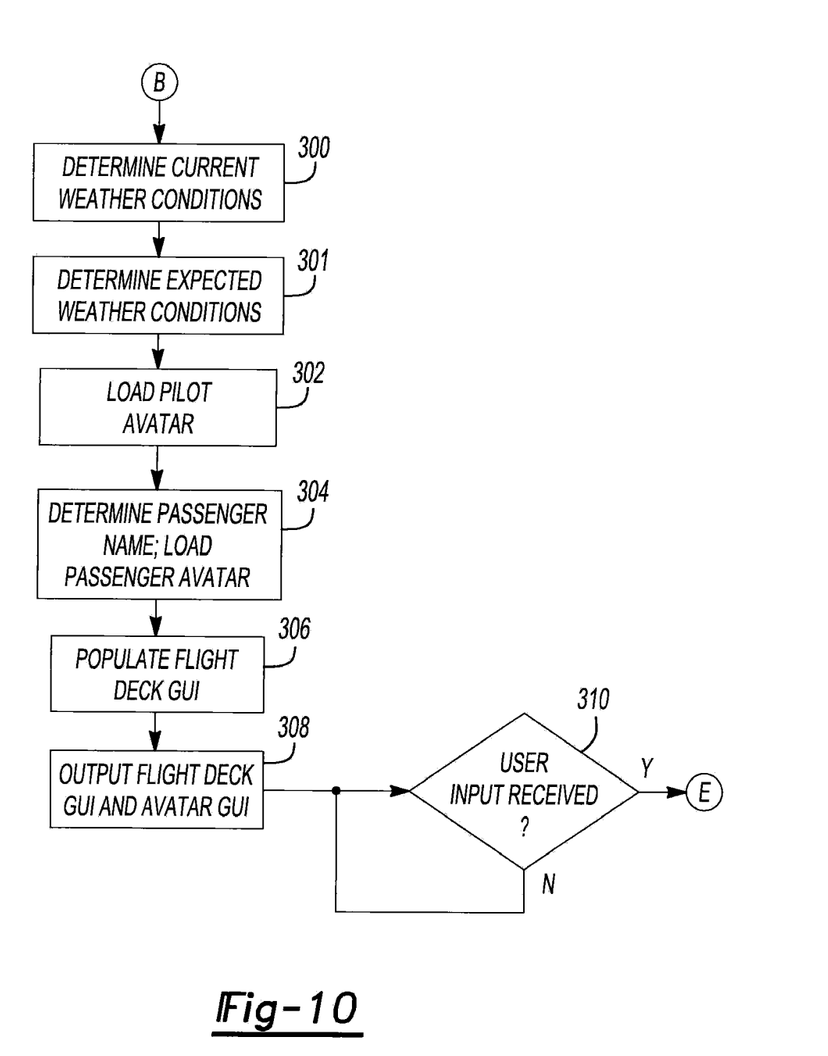
FIG. 10 is a flowchart illustrating an operational sequence for the virtual information control system of FIG. 3.

With reference now to FIG. 10, at operation 300, the method determines the current weather conditions for the aircraft 8 based on the weather data 50, and at operation 301, the method determines the expected weather conditions through which the aircraft 8 will travel based on the weather data 50. Then, at operation 304, the method determines the name of the passenger based on the user ID data 54, and loads the pilot avatar 68*a* from the avatar data store 71. At operation 306, the method populates the flight deck GUI 76. Then, at operation 308, the method outputs the flight deck GUI 76 and the avatar GUI 78 that includes the pilot avatar 90*a* (FIG. 7). At operation 310, the method determines if additional user input has been received from the user input device 30 that comprises a request for different data from the virtual information control module 10. If user input has been received, then the method goes to E on FIG. 8. Otherwise, the method loops until user input is received.

With reference back to FIG. 8, at operation 116, the method determines if galley data 60 has been requested by the passenger via the user input device 30. If galley data 60 has been requested by the passenger, then the method goes to C on FIG. 11. Otherwise, the method goes to operation 118.

Figure 11:
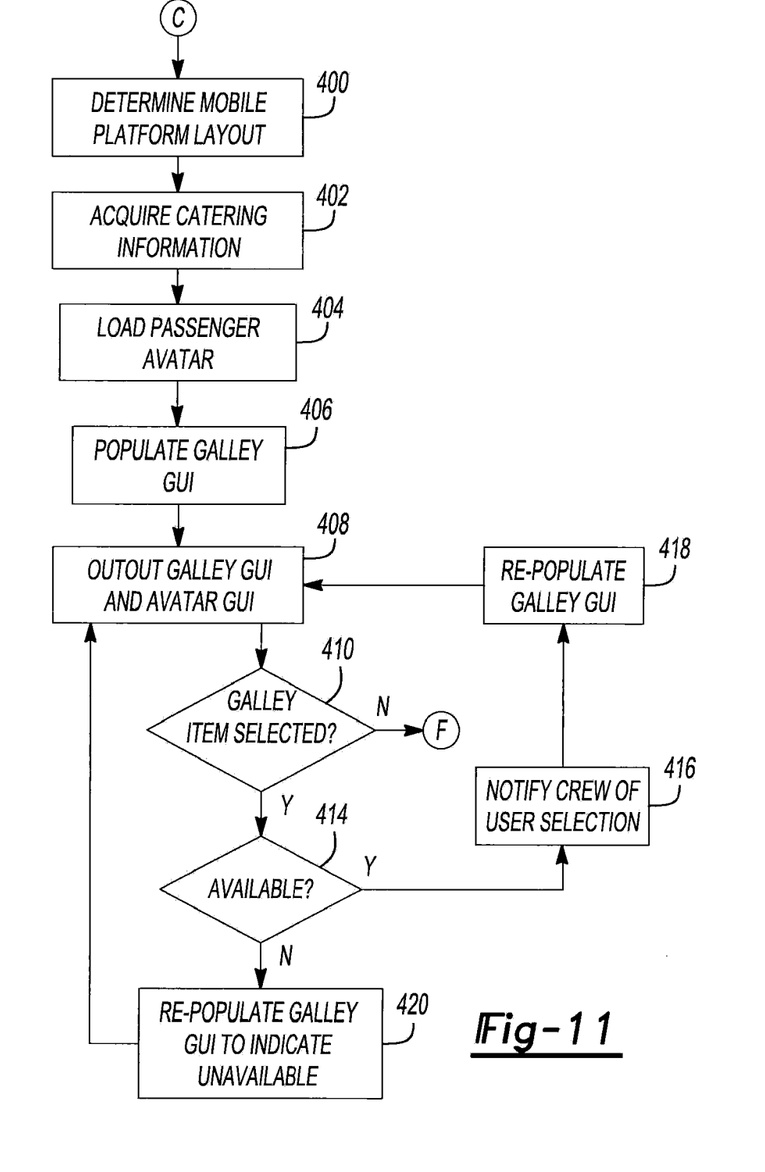
FIG. 11 is a flowchart illustrating an operational sequence for the virtual information control system of FIG. 3.

With reference to FIG. 11 at operation 400, the method determines the layout of the aircraft 8 based on the mobile platform data 64. Then, at operation 402, the method acquires the catering information or food service item information for the aircraft 8 based on the inventory data 58. Then, at operation 404, the method loads the passenger or user avatar data 68*b*. At operation 406, the method populates the galley GUI 74. At operation 408, the method outputs the galley GUI 74 and the avatar GUI 78, which graphically represents the user avatar 90*b* in the galley 20. At operation 410, the method determines if the passenger has made a selection of a food service item based on the passenger selecting an item from the menu associated with the beverage button 88 or the food button 86 with the user input device 30. If the passenger has not made a selection, the goes to F on FIG. 8.

Otherwise, if the passenger has made a food service item selection in operation 410, then at operation 414 the method determines if the food service item selection is available based on the inventory data 58. If the selection is available, then at operation 416 the method notifies the crew of the passenger's food service item selection via the control panel 28. At operation 418, the method repopulates the galley GUI 74 and then goes to operation 408. If, in operation 414, the passenger's food service item selection is not available, the method goes to operation 420. At operation 420, the method repopulates the galley GUI 74 to indicate to the passenger that the desired food service item is unavailable, and loops to operation 408.

With reference to FIG. 8, at operation 118, the method determines if a power down request has been received. If a power down request has been received, then the method ends. Otherwise, the method loops to operation 108.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for providing information to at least one passenger onboard a mobile platform comprising:
    a display device that displays the information;
    a source of user input coupled to the display device that enables the at least one passenger to request the information, the information including at least galley data;
    a galley control module that receives real time inventory data concerning food service items available for passenger consumption, and which generates the galley data that includes which ones of a plurality of the food service items are available onboard the mobile platform for passenger consumption;

a graphical user interface module that displays;

the food service items available onboard the mobile platform on the display device to enable the at least one passenger to select at least one of the at least one food service item; and a graphical representation of a status of an operational aspect of the mobile platform relative to a seat location where the passenger is located;

a source of user identification data that includes a name of the at least one passenger that requests the information;

a flight deck control module that generates flight deck data based on user identification data and weather data, the flight deck data including a personalized message from a flight crew member of the aircraft to the at least one passenger, by name of the at least one passenger, that describes a current status of weather conditions experienced by the aircraft; and wherein the graphical user interface module displays the personalized message from the flight crew member on the display device of the at least one passenger.

2. The system of claim 1, wherein the mobile platform is an aircraft and the information further comprises flight data.

3. The system of claim 2, further comprising:

a source of user identification data that includes an assigned seat of the at least one passenger that requests the information;

a source of mobile platform data that includes a layout of the aircraft;

a source of flight plan data that includes a status of operation of the aircraft based on a planned route of travel for the aircraft; and a flight control module that generates the flight data based on the user identification data, the mobile platform data and the flight plan data, the flight data including the status of the operation of the aircraft relative to the assigned seat of the at least one passenger.

4. The system of claim 3, wherein the graphical user interface module displays the status of the operation of the aircraft relative to the assigned seat of the at least one passenger on the display device and enables the at least one passenger to request additional detail regarding the status of operation of the aircraft relative to the assigned seat of the at least one passenger.

5. The system of claim 2, wherein the weather data includes current weather conditions experienced by the aircraft.

6. The system of claim 1, wherein the personalized message from the pilot is delivered by a pilot avatar.

7. The system of claim 6, further comprising:

an avatar database that stores data that includes pre-selected avatars for at least one of the at least one passenger and the pilot avatar; and an avatar module that determines, based on the user identification data, which of the pre-selected avatars corresponds to the at least one passenger.

8. A method of providing virtual information to at least one passenger onboard an aircraft comprising:

receiving at least one user input requesting information regarding the aircraft, the request for information including at least a request for flight deck data;

determining weather conditions currently experienced by the aircraft;

using real time inventory information pertaining to food service items available for distribution to passengers, and using a galley control module to provide such information upon request to the at least one passenger via the display device;

providing a source of user identification data that includes a name of the at least one passenger that requests the information;

generating flight deck data based on user identification data and weather data, the flight deck data including a personalized message from a flight crew member of the aircraft to the at least one passenger, by name of the at least one passenger, that describes current weather conditions experienced by the aircraft; and wherein a display device having a graphical user interface module, and being associated with a seat of the at least one passenger, displays:

the personalized message from the flight crew member on the display device of the at least one passenger;

a graphical representation of a flight deck of the aircraft with a pilot avatar; and a graphical representation of a status of an operational aspect of the mobile platform relative to a seat location where the passenger is located.

9. The method of claim 8, wherein receiving at least one user input requesting information further comprises:

receiving at least one user input requesting information that includes galley data; and displaying the inventory of the food service items on the display device to enable the at least one passenger to select at least one of the food service items.

10. The method of claim 9, wherein determining the inventory of the food service items further comprises:

updating the inventory of the food service items to indicate if any one of the food service items is no longer available.

11. The method of claim 9, further comprising:

receiving a user input that includes a selection by the at least one passenger; and notifying a crew member of the selection.

12. The method of claim 8, wherein receiving at least one user input requesting information further comprises:

receiving at least one user input requesting information that includes flight data;

determining a location of the at least one passenger requesting the flight data; and displaying the status of the operational aspect of the aircraft relative to the location of the at least one passenger.

13. The method of claim 12, wherein determining the location of the at least one passenger further comprises:

providing a source of mobile platform data that includes a layout of the aircraft;

providing the source of user identification data with data that includes an assigned seat of the at least one passenger; and determining the location of the at least one passenger in the aircraft based on the layout of the aircraft and the assigned seat of the at least one passenger.

14. An aircraft comprising:

a fuselage that includes a cockpit and a passenger cabin, the passenger cabin including at least one passenger seat, the at least one passenger seat including an in-flight entertainment system for use by at least one passenger onboard the aircraft;

a source of user identification data that includes a name of the at least one passenger that requests the information;

the in-flight entertainment system including a display that is operable to provide the at least one passenger with information regarding an operation of the aircraft, with display of the information controlled by a virtual information control system including:
a virtual information control module that outputs a flight graphical user interface, a galley graphical user interface or a flight deck graphical user interface to the display based on at least one user input; and
a galley control module that generates galley data that includes real time information of an inventory of available food service items available onboard the aircraft,
a flight deck control module that generates flight deck data based on user identification data and weather data, the flight deck data including a personalized message from a flight crew member of the aircraft to the at least one passenger, by name of the at least one passenger, that describes a current status of the operation of the aircraft based on the weather conditions experienced by the aircraft; and
wherein the graphical user interface module displays;
the personalized message from the flight crew member on the display of the at least one passenger;
a graphical representation of a flight deck of the aircraft;
a graphical representation of a status of an operational aspect of the aircraft relative to a seat location where the passenger is located; and
a detail button by which the passenger is able to request additional information on a status and workings of the aircraft relative to the passenger's seat location.

15. The aircraft of claim 14, wherein the virtual information control module further comprises:
a graphical user interface module that displays at least one of the food service items available onboard the aircraft as the galley graphical user interface based on the at least one user input to enable the at least one passenger to select at least one of the at least one of the food service items.

16. The aircraft of claim 14, wherein the virtual information control module further comprises:
the source of user identification data including an assigned seat of the at least one passenger;
a source of mobile platform data that includes a layout of the aircraft;
a source of flight plan data that includes a status of operation of the aircraft based on a planned route of travel for the aircraft; and
a flight control module that generates flight data based on the user identification data, the mobile platform data and the flight plan data, the flight data including a status of operation of the aircraft relative to the assigned seat of the at least one passenger.

17. The aircraft of claim 14, wherein the virtual information control module further comprises:
a source of user identification data that includes a name of the at least one passenger;
a source of weather data that includes current weather conditions experienced by the aircraft;
a flight deck control module that generates the flight deck data based on the user identification data and the weather data, the flight deck data including a personalized message from a pilot of the aircraft that describes a current status of the operation of the aircraft based on the weather conditions experienced by the aircraft; and
wherein the graphical user interface module displays the personalized message from the pilot on the display device as the flight deck graphical user interface.

18. The aircraft of claim 17, wherein the personalized message from the pilot is delivered by the pilot avatar.

19. A system for providing information to at least one passenger onboard an aircraft via at least one avatar comprising:
a display device that displays the information and the avatar;
a source of user input coupled to the display device that enables the at least one passenger to request the information, the information including galley data, flight deck data or flight data;
a source of user identification data that includes an assigned seat of the at least one passenger that requests the information, a layout of the aircraft, a status of operation of the aircraft based on a planned route of travel for the aircraft, a name of the at least one passenger that requests the information, and weather data that includes weather conditions experienced by the aircraft;
a galley control module that receives real time food service item inventory information to generate the galley data, the galley data including a graphical representation of at least one food service item available onboard the aircraft;
a flight control module that generates the flight data based on the user identification data and the flight plan data, the flight data including the status of the operation of the aircraft relative to the assigned seat of the at least one passenger illustrated by an avatar of the passenger requesting the information;
a flight deck control module that generates the flight deck data based on the user identification data and the weather data, the flight deck data including a message from a pilot avatar, directed to the at least one passenger by name, that describes a current status of the operation of the aircraft based on the weather conditions experienced by the aircraft;
a graphical user interface module that displays to the at least one user on the display device:
the galley data, the flight deck data, the flight data, and the message;
a graphical representation of a flight deck of the aircraft with a pilot avatar;
a graphical representation of a status of an operational aspect of the aircraft relative to a seat location where the passenger is located; and
a detail button by which the passenger is able to request additional information on a status and workings of the aircraft relative to the passenger's seat location.

20. A method of providing virtual information to at least one passenger onboard an aircraft via at least one avatar comprising:
providing a display device adjacent to the at least on passenger;
providing at least one avatar for each of the at least one passengers;
providing a source of user identification data that includes a name of the at least one passenger that requests the information;
receiving at least one user input requesting information regarding the aircraft, the request for information including at least a request for flight deck data, galley data or flight data;
determining a location of the at least one passenger requesting the information;
using a flight deck control module that generates flight deck data based on user identification data and weather data, the flight deck data including a personalized message from a flight crew member of the aircraft directed to the at least one passenger, by name of the at least one passenger, that describes a current status of the operation of the aircraft based on the weather conditions experienced by the aircraft;

using a galley control module to receive a real time inventory of food service items available on the aircraft;

using the galley control module to update the real time inventory of food service items to indicate if a food service item is no longer available; and displaying:
- the inventory of food service items on the display device as a graphical representation to enable the at least one passenger to browse the inventory of food service items using the at least one avatar;
- generating the personalized message using a pilot avatar on the display device of the at least one passenger;
- a graphical representation of a flight deck of the aircraft with a pilot avatar; and
- a graphical representation of a status of an operational aspect of the aircraft relative to a seat location where the passenger is located.

* * * * *